(12) United States Patent
Hirayama et al.

(10) Patent No.: US 8,307,143 B2
(45) Date of Patent: Nov. 6, 2012

(54) INTERFACE CARD SYSTEM

(75) Inventors: Katsuhiro Hirayama, Kanagawa-ken (JP); Hiroto Yoshikawa, Kanagawa-ken (JP); Yoshihiro Ueda, Kanagawa-ken (JP); Osamu Mikami, Kanagawa-ken (JP)

(73) Assignee: d-broad, Inc., Kanagawa-ken (JP)

( * ) Notice: Subject to any disclaimer, the term of this patent is extended or adjusted under 35 U.S.C. 154(b) by 294 days.

(21) Appl. No.: 12/771,072

(22) Filed: Apr. 30, 2010

(65) Prior Publication Data

US 2011/0238880 A1    Sep. 29, 2011

(30) Foreign Application Priority Data

Mar. 23, 2010  (JP) .................................. 2010-065458

(51) Int. Cl.
*G06F 13/20* (2006.01)
*G06F 13/40* (2006.01)

(52) U.S. Cl. ........ 710/308; 710/300; 710/301; 710/302; 710/313; 710/314; 710/315

(58) Field of Classification Search .................... 710/301
See application file for complete search history.

(56) References Cited

U.S. PATENT DOCUMENTS

| | | | | |
|---|---|---|---|---|
| 5,748,913 A * | 5/1998 | Shibahara | ...................... | 710/301 |
| 5,887,145 A * | 3/1999 | Harari et al. | ................... | 710/301 |
| 6,069,795 A * | 5/2000 | Klatt et al. | ...................... | 361/737 |
| 6,097,605 A * | 8/2000 | Klatt et al. | ...................... | 361/737 |
| 6,266,724 B1 * | 7/2001 | Harari et al. | ................... | 710/301 |
| 6,658,516 B2 * | 12/2003 | Yao | ................................ | 710/301 |
| 7,209,995 B2 * | 4/2007 | Pinto et al. | ...................... | 710/301 |
| 7,581,040 B2 * | 8/2009 | Irisawa | ........................... | 710/33 |
| 7,624,216 B2 * | 11/2009 | Yoshikawa et al. | ........... | 710/301 |
| 7,856,527 B2 * | 12/2010 | Yoshikawa | ..................... | 711/114 |
| 8,019,923 B2 * | 9/2011 | Asfur | .............................. | 710/301 |
| 2002/0111771 A1 * | 8/2002 | Huang et al. | ................... | 702/186 |
| 2004/0103234 A1 * | 5/2004 | Zer et al. | ........................ | 710/301 |
| 2005/0033917 A1 * | 2/2005 | Takeuchi | ....................... | 711/115 |
| 2005/0086434 A1 * | 4/2005 | Kang et al. | ..................... | 711/115 |
| 2007/0233907 A1 * | 10/2007 | Yoshikawa et al. | ............. | 710/26 |
| 2010/0223412 A1 * | 9/2010 | Jung | ............................... | 710/301 |
| 2011/0197008 A1 * | 8/2011 | Itou et al. | ....................... | 710/301 |

FOREIGN PATENT DOCUMENTS

WO    2006/035738 A1    4/2006

* cited by examiner

*Primary Examiner* — Ryan Stiglic
(74) *Attorney, Agent, or Firm* — Griffin & Szipl, P.C.

(57) ABSTRACT

There is provided an interface card system for SD bus control. The interface card system for SD bus control includes a CPU bus interface 11a and/or an SD bus interface 11b, a host interface module 16 connected to the interfaces which interprets an SD command and controls operation of the whole of the interface card system, first and second internal SD host engines 15a and 15b which function as a host controller, first and second selectors 14a and 14b respectively connected to the internal SD host engines which each select a path for data or a command, first and second SD bus interfaces 13a and 13b respectively connected to the selectors, and a data pass-through control section 17 connected to the SD bus interfaces connected to the selectors which allows an SD command and data to pass through.

10 Claims, 5 Drawing Sheets

SD-DMA block diagram

PROCESSING OF RCA VALUES IN RESPONSE TO CMD a AND CMD b

INTERFACE CARD SYSTEM

This application claims priority from Japanese Patent Application No. 2010-065458, filed Mar. 23, 2010, the entire disclosure of which is incorporated herein by reference.

BACKGROUND OF THE INVENTION

1. Field of the Invention

The present invention relates to an interface card system which is used to intervene between an SD (Secure Digital) card device and a host system (a CPU system or an SD host system).

2. Description of the Related Art

SD card devices are in widespread use as peripheral devices for extending host system functionality. An SD host controller is a logic circuit incorporated in a host system. The SD host controller exchanges data and commands with an SD host controller on the side of an SD card device via an SD bus interface, thereby controlling the operation of the SD card device.

Patent Document 1: International Publication No. WO 2006/035738

However, data to be exchanged between an SD card device and an SD host controller has often been sent to a host system via a bus on the host system side. This consumes resources such as a CPU, a memory, and the like of a host system and causes an increase in processing load on the host system side.

Also, if a host system includes a host controller capable of controlling two SD card devices independently of each other to transfer data between SD card devices, use of a system which sends data to a CPU on the host system side prior to transfer reduces the throughput.

SUMMARY OF THE INVENTION

The present invention has been made in consideration of the above-described circumstances, and has as its main object to provide a high-performance interface card system for SD bus control capable of complying with a new next-generation SD bus standard aiming for higher speed and higher capacity.

An interface card system according to the present invention is an interface card system which is used to intervene between an SD card device and a host system, comprising a CPU bus interface (11a) and/or an SD bus interface (11b) serving as an interface with the host system, a host interface module (16) connected to the interface which interprets an SD command and controls operation of the whole of the interface card system, first and second internal SD host engines (15a, 15b) connected to the host interface module which function as a host controller for the SD card device, first and second selectors (14a, 14b) respectively connected to the internal SD host engines which each select a path for data or a command, first and second SD bus interfaces (13a, 13b) respectively connected to the selectors which serve as interfaces with the SD card device, and a data pass-through control section (17) connected to the SD bus interfaces connected to the selectors which allows an SD command and data to pass through as needed.

The above configuration allows independent control of two SD card devices with no load on a CPU on the host system side.

The configuration may be such that the first and second internal SD host engines (15a, 15b) each include a direct transfer interface and include a DMA (Direct Memory Access) handler (18), and a transfer mode and a data transfer path of each SD host engine are selected by a direct transfer interface control signal issued through the DMA handler.

According to this configuration, the direct transfer interfaces are constructed between the two SD engines (15a, 15b). High-speed, high-capacity transfer can be realized with no load on the system host side.

For the configuration, two cases are conceivable: a case where the interface card system is connected to the host system via the CPU interface and a case where the interface card system is connected to an SD host controller via the SD bus interface. In the former case, the interface card system acts as an SD host controller provided with the two independent SD host engines for the system side.

In the latter case, the interface card system acts as one SD card device for the system side serving as the SD host controller. In this case, if the SD card device is composed of an SD memory card and an SDIO device, and the host system is an SD host controller which is connected via the SD bus interface, the SD bus interface preferably performs arbitration to prevent contradiction from occurring at the time of command exchange and data transfer by the SD bus interface by performing rewriting of a response and data issued by the SD card device, blocking of an unnecessary response, and adjustment of response timing, in order to cause the host system to recognize the interface card system as a single SD card device.

Possible applications of an interface card system according to the present invention include a combo card (hereinafter referred to as an "SD memory combo card" or an "SD memory card"), wherein the above interface card system and a first SD card device are connected to each other via the first SD bus interface (13a), and a slot to be connected to a microSD card is connected to the SD memory combo card via the second SD bus interface (13b), and the SD memory combo card is housed in an SD card device housing to be inserted into a standard SD memory slot.

The present invention provides a new SD bus control system which is used to intervene between a system-side bus and an SD card device. The present invention makes it possible to form an SD bus control section into a small module and implement the small module in a one-chip LSI or the like. Since the interface card system can be applied both to a host-side system and to an SD card device-side system, it has wide applications and is highly versatile. It is thus possible to significantly reduce development costs and the time needed for development.

BRIEF DESCRIPTION OF THE DRAWINGS

FIG. 4 is a chart for explaining exchange of data in rewriting of a response and data or the like.

DETAILED DESCRIPTION OF THE PREFERRED EMBODIMENTS

Embodiments of the present invention will be described below. The embodiments are not mutually exclusive but complementary to each other. The same or similar parts thus are denoted by the same reference numerals. An SD card device is an example, and various changes may be made depending on the purpose.

First Embodiment

Figure 1:
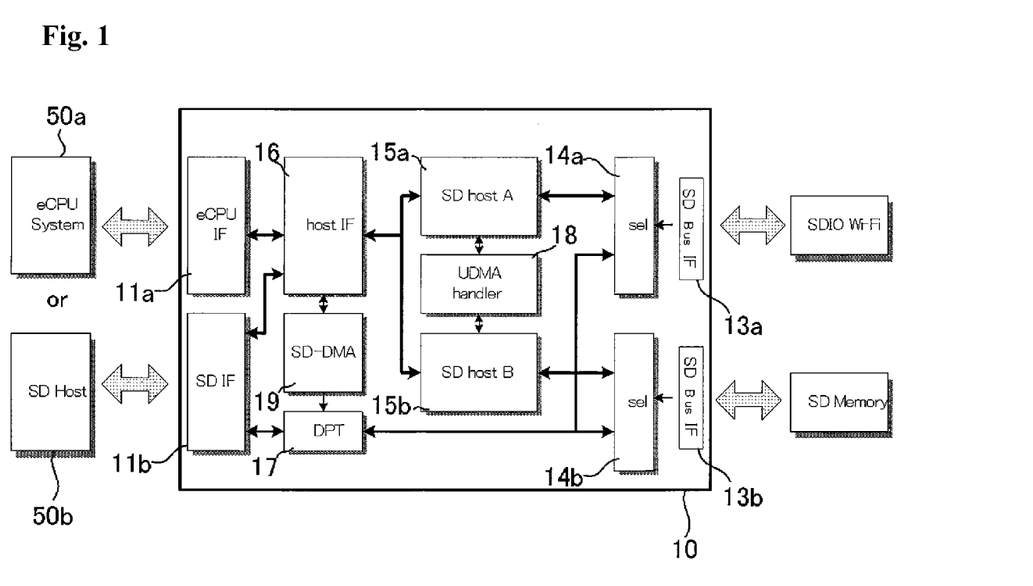
FIG. 1 is a schematic block diagram of an interface card system according to a first embodiment.

FIG. 1 shows a schematic block diagram of an interface card system according to a first embodiment.

An interface card system 10 according to the first embodiment includes two external bus interfaces to be connected to independent system buses as system-side buses. One of the external bus interfaces is an eCPU bus interface 11a (e.g., a "microcomputer interface") to be connected to an embedded CPU (eCPU) system 50a. The other one is an SD bus interface 11b to be connected to an external SD host 50b.

In principle, either one of the two system bus interfaces to be connected to the system-side buses is selected to operate. In the present specification, a mode in which an eCPU bus is selected as a system bus will be referred to as a "system-side eCPU bus mode," and a mode in which the SD bus interface 11b is selected will be referred to as a "system-side SD bus mode."

The interface card system 10 according to the present embodiment also includes two independent SD bus interfaces 13a and 13b for client-side buses. The interface card system 10 can connect to SD card devices 60a and 60b of all kinds (e.g., an SD memory card, a wireless communication card, a GPS card, a broadcast radio wave receiver, or any other card device to be connected to an SD slot) via the two interfaces 13a and 13b. The SD card devices 60a and 60b are independently controlled by internal SD host engines 15a and 15b, respectively. Note that examples of the SD card devices include a miniSD memory card, a microSD memory card, and an embedded SD memory.

An example of the external SD host 50b is an SD host controller. Examples of the SD host controller include single-core SD host controllers in widespread use and so-called dual-core SD host controllers which have been developed by the present inventors and each include two SD host cores. In the system-side SD bus mode, an SD device including the interface card system 10 according to the present embodiment is recognized as one SD card device (SD combo card) by the system side. Received SD commands and data except for those associated with access to an internal register are all allowed to pass through to the devices 60a and 60b on the SD card side after predetermined arbitration.

As shown in FIG. 1, the two independent SD bus interfaces 13a and 13b are connected to the two independent internal SD host engines 15a and 15b via selectors 14a and 14b, respectively. That is, this portion can be said to be a portion functioning as a so-called dual-core SD host controller.

The two internal SD host engines 15a and 15b are connected to one host interface module 16 via a common internal bus. A path from the host interface module 16 forks into two branches, which are connected to the eCPU bus interface 11a and the SD bus interface 11b corresponding to the system-side buses. The host interface module 16 is a logic circuit which interprets a command sent from an SD host engine on the system side. The host interface module 16 allows the interface card system 10 according to the present embodiment to operate as one client device (SD card device) for the external SD host.

The role of the selector 14a (or 14b) is to choose whether to pass data to be passed to the SD card device 60a (or 60b) to the internal SD host engine 15a (or 15b) or to a data pass-through control section (DPT) 17. The DPT 17 is a logic circuit which is connected to the SD bus interface 11b on the system bus side. The role of the DPT 17 is to allow SD commands and data originating from the external SD host 50b on the system side and destined for the SD card devices 60a and 60b to pass through after predetermined arbitration.

The two internal SD host engines 15a and 15b each have a direct transfer interface and are connected to each other via a DMA handler 18. The internal SD host engines 15a and 15b are configured to be capable of DMA-transferring pieces of data to be exchanged between the SD card devices (60a and 60b) destined for the hosts (15a and 15b) without transferring the pieces of data to the system bus side. The DMA handler 18 has the function of controlling the direct transfer interfaces between the internal SD host engines 15a and 15b and directly reading/writing data between the hosts.

The host interface module 16 is also connected to an SD-DMA controller 19. The SD-DMA controller 19 is configured to cause data to be DMA-transferred to the DPT 17. That is, the SD-DMA controller 19 provides the function (SD-DMA mode) of directly transferring data between SD card devices inserted in SD slots by bypassing a CPU on the system side.

Figure 2:
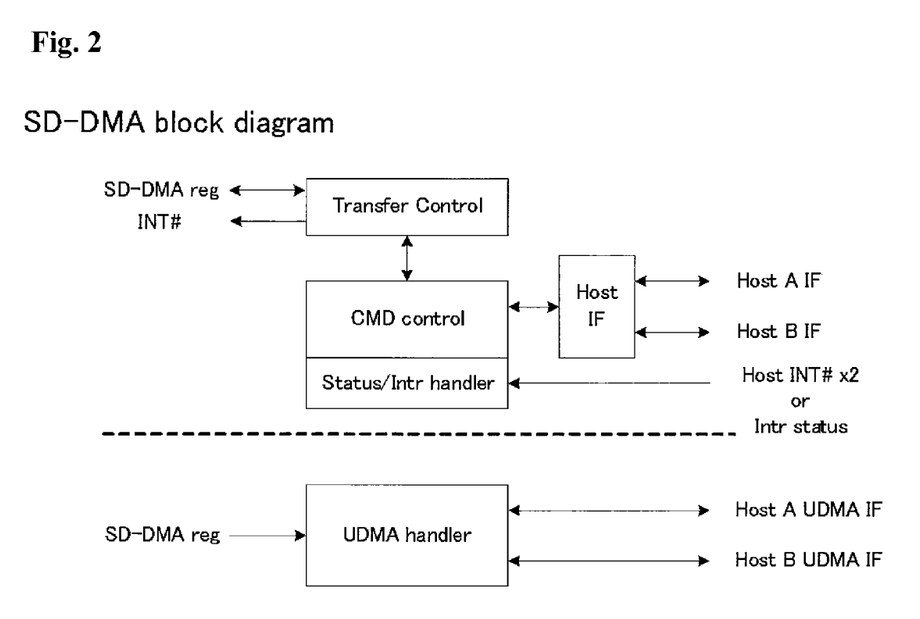
FIG. 2 is a block diagram of an SD-DMA mode in the interface card system according to the first embodiment.

FIG. 2 shows a block diagram of the SD-DMA mode. As shown in FIG. 2, in the SD-DMA mode, the SD-DMA controller 19 performs transfer control (Transfer Control) and command control (CMD control) using a specially prepared register (SD-DMA register). Meanwhile, a direct transfer interface control signal issued via the DMA handler 18 controls the direct transfer interfaces of the two host engines 15a and 15b. In Transfer Control, DMA transfer is started by setting a "Start SD-DMA register" to 1 and passing necessary information to a CMD Control block. After the end of set data transfer, an interrupt is issued. A plurality of SD commands need to be issued during running in the SD-DMA mode. The value of a "max block count register" is used as the maximum block count per SD command.

If the system side is in the SD bus mode, access to an SDIO command is assigned to the SD-DMA register. The SD-DMA controller accesses the internal SD host engines and issues SD commands in accordance with settings. Direct transfer of data is performed between the internal SD host engines (15a and 15b). For example, assume a configuration in which the internal SD host engine 15a controls a wireless communication card (SDIO card), and the internal SD host engine 15b controls an SD memory card. This configuration allows transfer of data stored in the SD memory at high speed via the wireless communication card and recording of data received by the wireless communication card in the SD memory at high speed.

If the SD-DMA mode is being run, clocks from the internal SD host engines 15a and 15b are supplied as SD clocks to SD card devices. Otherwise, SD clocks supplied from the system side are supplied to SD card devices. While the SD-DMA mode is being run, interrupts from an SDIO host are all blocked, and the system side are not notified of the interrupts. Only an SD-DMA suspend status and an enable register generate interrupts. If it is necessary to issue an SDIO command during running in the SD-DMA mode in order to process an SDIO card interrupt, SD-DMA needs to be suspended. While SD-DMA is suspended, the SD buses connected to the two internal SD host engines 15a and 15b are in a pass-through state.

The eCPU bus interface 11a has the function of transferring data by bypassing a CPU by means of a so-called "DMA function" using general commands such as DREQ and DACK. A burst length preferably supports any of 1 cycle, 4 cycles, 8 cycles, and 16 cycles. Of various types of DMA, only SDMA provided by a general SD host standard is allowed to be used. The value of a DMA address register on the internal SD host engine side is preferably not used. The configuration is preferably such that the address on the internal SD host engine side used in DMA is neglected and such that SD data is always transferred. Bus timing in DMA can be set by a register.

The interface card system 10 according to the present embodiment provides an entirely new bus control system which is used to intervene between two independent system-side buses and two independent SD card devices. A circuit for realizing such a function can be implemented in a relatively simple one-chip integrated circuit device (e.g., an LSI).

Note that the present embodiment is not necessarily limited to the above-described example. The present embodiment may be realized by using a plurality of modules and the like in combination. Alternatively, the function of the interface card system according to the present embodiment may be realized as a part of another system LSI. Various changes may be made to the number and types of functional blocks and other configurations.

Second Embodiment

System-Side eCPU Bus Mode

Operation modes of the interface card system 10 according to the first embodiment will be described below on the premise that the interface card system 10 is used. The operation modes are roughly divided into two types: a "system-side eCPU bus mode" and a "system-side SD bus mode."

Figure 3A:
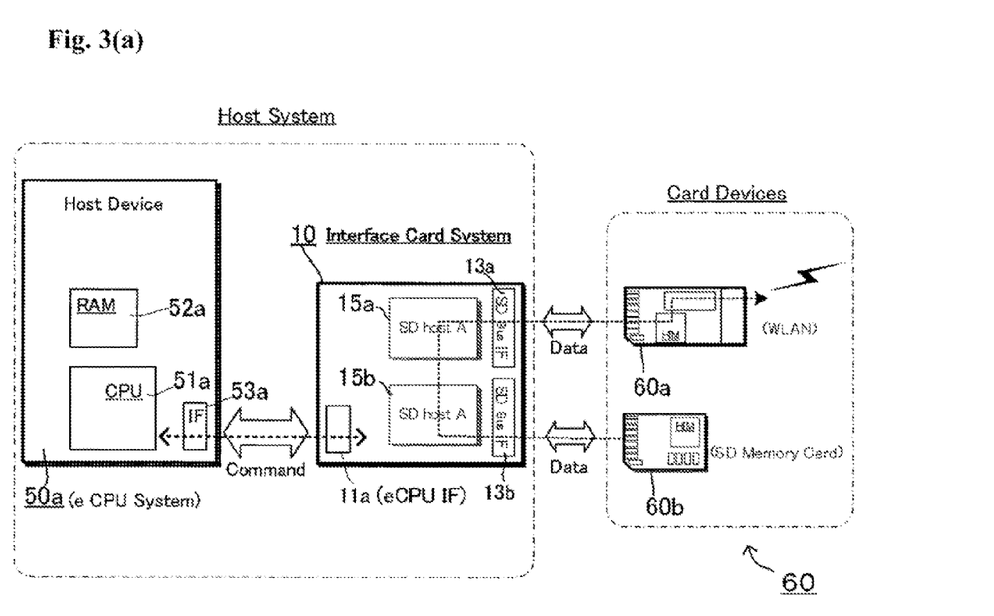
FIG. 3(A) shows an example in which an interface card system 10 according to the first embodiment is incorporated in hardware resources (a host system) on the host system side.

If an eCPU system is selected as a system-side bus, the interface card system 10 in the present embodiment is recognized as a dual-core SD host controller by an eCPU system 50a serving as a host system.

FIG. 3(A) shows an example in which the interface card system 10 according to the first embodiment is incorporated in hardware resources on the host system side (a host system) on the premise that the interface card system 10 is used in the system-side eCPU bus mode. Note that some of the functional blocks of the interface card system 10 are omitted. As shown in FIG. 3(A), the host system connects to the interface card system 10 according to the first embodiment via a system bus interface 53.

Examples of the eCPU system 50a include a common information processing system device and a digital home appliance system device. The eCPU system 50a includes a CPU 51a which controls the whole or a part of the system, a primary storage memory (RAM) 52a, and a system bus interface 53a. If the eCPU system 50a is configured to support 16 bit/32 bit little endian and big endian formats, it has a high degree of design flexibility. For example, the eCPU system 50a can select a data placement method depending on the hardware resources on the host system side.

Arbitrary SD card devices can be connected as SD card devices 60a and 60b. The SD card devices 60a and 60b can be controlled from the host system side. The example, in which an SDIO wireless communication card is connected to a first SD bus interface 13a, and an SD memory card is connected to a second SD bus interface 13b, is illustrated here. The SD memory card may be a miniSD memory card or a microSD memory card.

The SD card devices 60a and 60b are controlled by two independent internal SD host engines 15a and 15b, respectively. Control of the operation of the internal host engines by minimum control commands from the host system side allows direct transfer of data between the SD card devices by bypassing the host system. With this configuration, high-speed, high-capacity data communication can be performed between the SD card devices without occupying the hardware resources on the host system side (e.g., the CPU 51a, the memory 52a, and the system bus interface 53a of the host device).

If the interface card system 10 according to the first embodiment is used in the system-side eCPU bus mode, incorporation of the interface card system 10 into the host system side allows independent control of two SD card devices. Additionally, since the interface card system 10 performs most of processing by means of a bus control function, it can be used as a high-performance SD host controller capable of minimizing the load on hardware resources (resources such as a CPU, a memory, and a system bus) on the host system side.

Note that although FIG. 3(A) is illustrated with an example in which the interface card system 10 is implemented in a one-chip LSI or the like in mind, a similar host system may be constructed by incorporating the interface card system 10 in a CPU on the host system side. Any combination of SD card devices may be used.

Third Embodiment

System-Side SD Bus Mode

Figure 3B:
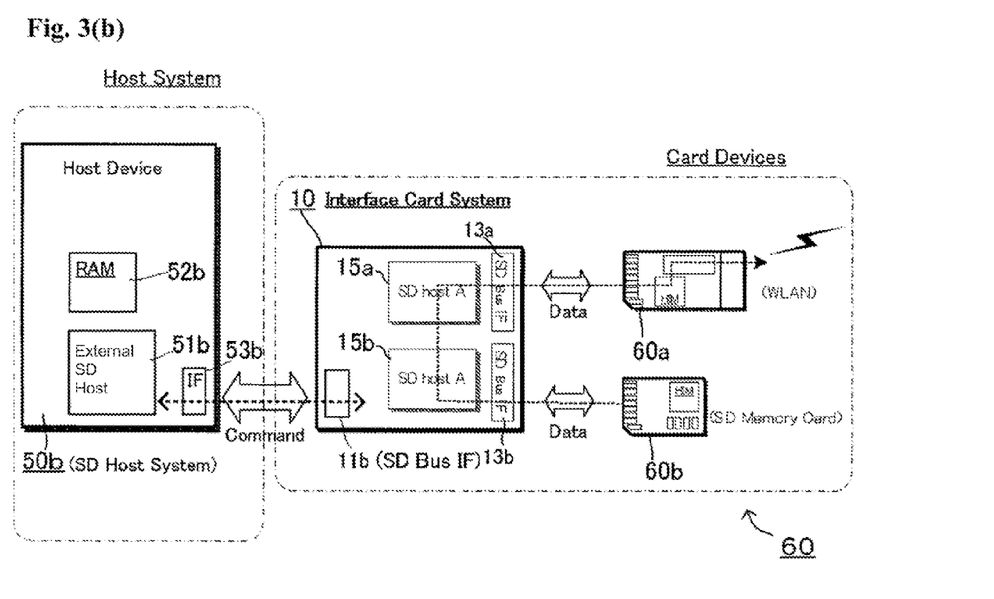
FIG. 3(B) shows an example in which the interface card system 10 according to the first embodiment is incorporated in hardware resources (a card device) on the SD card device side.

FIG. 3(B) shows an example in which the interface card system 10 according to the first embodiment is incorporated in hardware resources (a card device) on the SD card device side on the premise that the interface card system 10 is used in the system-side SD bus mode.

Examples of an SD host system 50b include a laptop personal computer, a personal digital assistant, a digital camera, and a digital video. The SD host system 50b includes an external SD host 51b, a primary storage memory (RAM) 52b, and a system bus interface 53b.

If the external SD host 50b is selected as a system-side bus, as shown in FIG. 3(B), the interface card system 10 in the present embodiment is recognized as an SD combo card obtained by combining the interface card system and two SD card devices and the like, i.e., one SD card device by the external SD host 50b.

In practice, SD card devices are to be connected to the two SD bus interfaces 13a and 13b, respectively. A mechanism for causing the host side to recognize the interface card system 10 as a single SD card device is necessary.

An SDIO card device and an SD memory card have in common that both of them are card devices controlled by an SD host complying with a standard defined by the SD Association (SDA) and connected to SD bus interfaces. For command systems of the card devices, there are commands common to the card devices and commands separately defined for the card devices. The present embodiment, in which card devices whose command systems are partially different as described above are implemented in one card to form an SD combo card, requires processes such as a response to each command and rewriting of data to be appropriately performed. This point will be described below.

The interface card system 10 in the present embodiment appears to the external SD host 50b to operate as an SD combo card. Accordingly, the interface card system 10 first requires an SDIO card controller function in order to exchange commands and data with the external SD host 50b.

Processing is performed such that SDIO Function2 provided by the SDIO standard is virtually assigned to an internal register of an SD bus interface 11b (hereinafter referred to "Virtual Fn2"). The word "virtually" is used because the interface card system is not actually a single SD card device to the external SD host 50b and has two functions, SDIO and an SD memory. The processing allows the SD bus interface 11b to interpret particular information of a command from an SD host and generate responses to various commands, data, status information, and the like. An initialization command performs software reset of the interface card system 10 in the present embodiment. Assume that Virtual Fn2 is readable/writable at any time, regardless of the status of the card.

The SD bus interface 11b has the function of rewriting a response and data, adjusting timing for the rewriting, and blocking an unnecessary response as needed when it allows a command and data to pass through the interface card system 10 via a DPT 17. More specifically, the SD bus interface 11b passes a response and data after adjusting them to be delayed by several cycles of SDCLK. The delay adjustment allows determination of an SD command number, reading and writing, and access to Fnx. For commands common to the SDIO card and the SD memory card, arbitration is performed to prevent responses from colliding with each other. Among a group of commands of different command systems, commands for SDIO and commands for an SD memory are identified. Commands unnecessary for both the cards are not allowed to pass through, and adjustment is performed to prevent contradiction.

According to the SD specs, an SD host and an SD card device communicate with each other using a unique identification code called an RCA (hereinafter referred to as an RCA value). For this reason, an SD host issues a command for checking an RCA value if necessary, and an SD card device returns its RCA value as a response to the command. The SDIO standard specifications require an SD combo card to have one RCA value. However, if the interface card system in the present embodiment is used, since the interface card system actually involves two SD card devices, and the SD card devices each have an RCA register, the interface card system inevitably has two RCA values. The present system needs to appear to the external SD host 50b to have one RCA value. Under the circumstances, the present system has the function of allowing driver software which controls an external SD host to recognize only the RCA value of one SD card device (e.g., an SD card device 60a) and allowing definition of two RCAs for respective SD card devices inside the system.

Processing of an RCA value in a command related to a response from an SD memory will be described. The SDIO standard specifications require an SD combo card to have one RCA value. However, if the interface card system in the present embodiment is used, since two SD card devices each have an RCA register, the interface card system inevitably has two RCA values. The present system needs to appear to the external SD host 50b to have one RCA value. Under the circumstances, the present system is configured to analyze commands from an SD memory and an SDIO device, thereby showing only the RCA value of one SD card device (e.g., the SD card device 60a) to a driver which controls an external SD host and setting two RCAs in a card inside the system.

Figure 4:
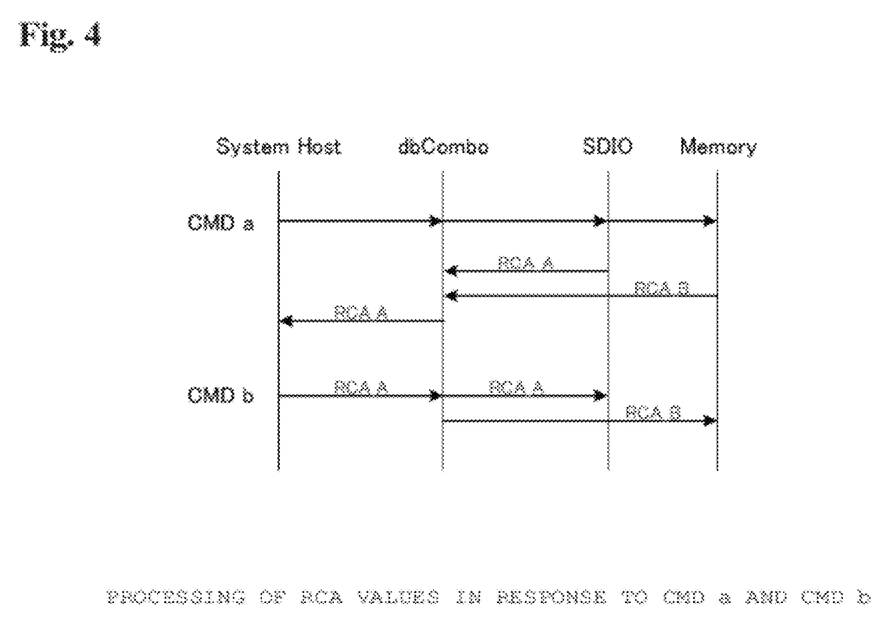

FIG. 4 is a chart for explaining exchange of an RCA value between the SD combo card according to the present embodiment and the external SD host. As shown in FIG. 4, the interface card system in the present embodiment actually has the RCA value of the SDIO card device, RCA_A, and the RCA value of the SD memory card, RCA_B. Inside the SD combo card, access is gained with a distinction between the two RCA values. The interface card system is designed to cause the external SD host to recognize only the RCA value (RCA_B) of a predetermined one of the SD card devices (e.g., the SD memory card). According to the SD specs, an SD combo card including an SD memory is required by an SD host to pass the card status of the SD memory. Accordingly, the present embodiment uses the RCA value of the SD memory card as the RCA value of the SD combo card.

In order to prevent bus collision, if one of the SD card devices is an SD memory card, it is necessary to prevent the system side from being notified of an SDIO card interrupt during access from the external SD host 50b on the system side to the SD memory. To this end, the interface card system needs to be configured to support an asynchronous SDIO interrupt at the time of the stop of an SD clock.

EXAMPLE

A typical application of the third embodiment will be described.

Figure 5A:
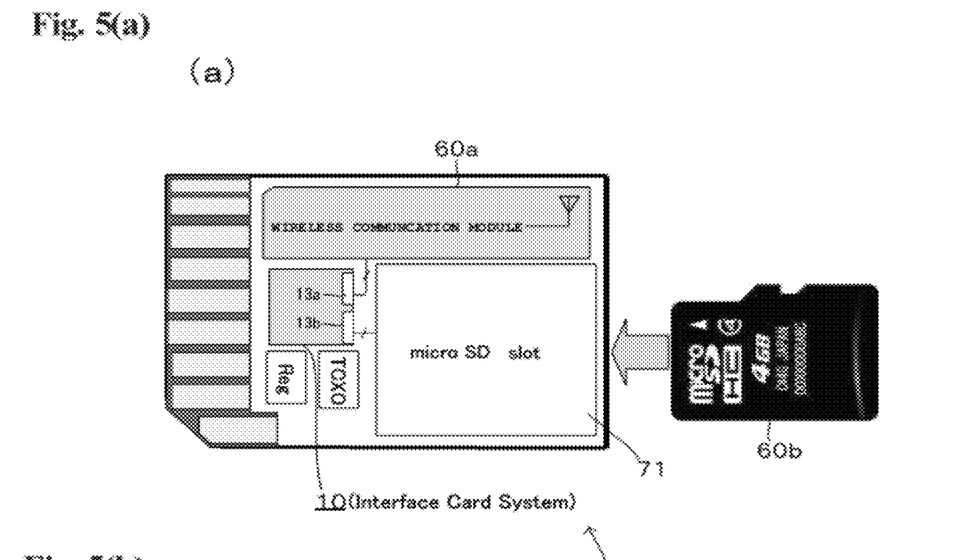
FIG. 5(A) is a schematic functional block diagram for explaining an example of an SD memory/wireless communication device combo card.
Figure 5B:
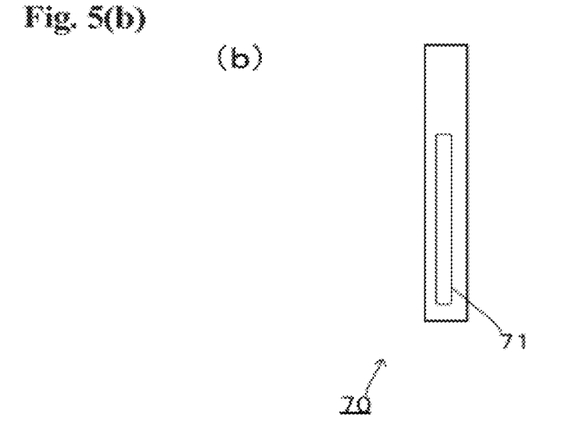
FIG. 5(B) is a view of a housing of the card in FIG. 5(A) as seen from the back.

FIG. 5(A) is a schematic functional block diagram for explaining an example of an SD memory/wireless communication device combo card, and FIG. 5(B) is a view of a housing of the card in FIG. 5(A) as seen from the back. As shown in FIGS. 5(A) and 5(B), an SD memory/wireless communication device combo card 70 of the example is housed in a housing of an SDIO card (or a general SD memory card) and includes a connector 71 for a microSD memory card into which a microSD card is to be inserted.

The interface card system 10 according to the first embodiment, the wireless communication module 60a connectable to the SD bus interface 13a, and other components such as a crystal oscillator necessary for realizing a wireless communication function and a register are provided inside the housing. The wireless communication module 60a provides a wireless communication function. For a memory function, the microSD card 60b can be connected via the connector 71 for a microSD card connected to the SD bus interface 13b.

The wireless communication function can be provided without attaching a microSD memory. A user's memory can be used as the microSD memory. Since a microSD memory is replaceable, a function convenient to a user can be provided.

The present embodiment is implemented in the system-side SD bus mode and can support the SD-DMA mode described above. That is, the present embodiment is capable of transmitting data held in the microSD memory card 60b via the wireless communication module 60a and directly recording data received by the wireless communication module 60a in the microSD memory card 60b by bypassing the CPU on the host side.

Examples of the wireless communication module 60a include a wireless LAN module (Wi-Fi) complying with IEEE802.11n(b/g), a module which realizes short-distance, high-speed wireless transfer, such as a TransferJet (registered trademark) module, a Bluetooth (registered trademark) module, and a Giga IRDA (high-speed visible light communication) module.

Since the SD memory/wireless communication device combo card of this example itself can be used as an SD card device, i.e., a peripheral device of a host system, various usage patterns are possible. For example, if the SD memory/wireless communication device combo card is attached to a personal digital assistant including a connector for an SDIO card, data of a still image or a moving image shot by the personal digital assistant or data received by the personal digital assistant via the Internet or the like can be instantaneously transferred simply by touching the receiving terminal. Even if a receiving terminal is not available, data can be read out from the SD memory/wireless communication device combo card as a general SD memory card by a host machine. Alternatively, the SD memory/wireless communication device combo card of this example may be incorporated into every type of sensor system. This case can simultaneously realize two functions of recording and communication, such as recording observation data acquired by a sensor system in an SD memory or the like and transmitting recorded data and the like to another system by means of the wireless communication function.

If a wireless LAN module is connected in a so-called "infrastructure mode" using an access point, the wireless LAN module can connect to a device within another LAN via the access point. In addition, if a wireless LAN module is connected in an "ad hoc mode," the wireless LAN module can directly communicate data with a device including another wireless LAN function by bypassing a host machine.

The above description has been given with a focus on a transmitting function of a wireless communication device. In terms of a receiving function of a wireless communication module (e.g., the function of receiving radio waves such as a GPS function or a One Seg broadcast receiving function), received data can be recorded in a microSD memory or can be allowed to pass through to the host system side and can be transferred.

An example in which the second embodiment and the third embodiment are combined, the SD memory/wireless communication device combo card described in the example of the third embodiment is attached to one or each of two SD slots of a host system is also possible.

As has been described above, the aforementioned embodiments are each advantageous in that the load on resources on the host system side and an internal data bus on the host system side decreases and that data can be directly transferred between SD card devices by bypassing a host system.

An interface card system according to the present invention can be incorporated into every type of host machine. If the interface card system is formed into a one-chip LSI, it can also be incorporated into an SD card device. The interface card system has extremely high industrial applicability as a high-value added built-in module for developing an SD card application.

What is claimed is:

1. An interface card system configured to intervene between a host system and a first and a second Secure Digital card device, the interface card system comprising:
   a CPU bus interface and a front Secure Digital bus interface on host side, both serving as an interfaces for the host system;
   a host interface module connected to both the CPU bus interface and the front Secure Digital bus interface on host side, wherein the host interface module interprets a Secure Digital command and controls operation of the whole of the interface card system;
   a first and a second internal Secure Digital host engines each connected to the host interface module,
      wherein the first and second internal Secure Digital host engines are operative as a host controller for the first and second Secure Digital card devices respectively,
      wherein each of the first and second internal Secure Digital host engines includes a direct transfer interface via which the first and second internal Secure Digital host engines are connected to a UDMA handler, and
      wherein a transfer mode and a data transfer path of each of the first and second internal Secure Digital host engines are selected by a direct transfer interface control signal issued through the UDMA handler;
   a first and a second selectors connected to the first and second internal Secure Digital host engines, respectively, wherein each selector selects a path for data or a command;
   a first and a second Secure Digital bus interface on device side connected to the first and second selectors, respectively, wherein the first and second Secure Digital bus interfaces on device side serve as interfaces with the first and second Secure Digital card devices, respectively; and
   a data pass-through control section connected to the front Secure Digital bus interfaces on host side and the first and second selectors, wherein the data pass-through control section allows Secure Digital commands and data to pass through as needed.

2. The interface card system according to claim 1, wherein the interface card system is connected to an embedded CPU system as the host system via the CPU bus interface.

3. The interface card system according to claim 1, wherein the interface card system is connected to an Secure Digital host controller as the host system via the front Secure Digital bus interface on host side.

4. The interface card system according to claim 1, wherein the first Secure Digital card device is a Secure Digital memory card and the second Secure Digital card device is a Secure Digital Input Output device, and the host system is a Secure Digital host controller which is connected to the interface card system via the front Secure Digital bus interface on host side,
   wherein the front Secure Digital bus interface on host side performs arbitration to prevent contradiction from occurring at the time of command exchange and data transfer by rewriting a response and data issued by the first and second Secure Digital card devices, blocking an unnecessary response, and adjusting response timing,
   in order to cause the host system to recognize the interface card system as a single Secure Digital card device.

5. A Secure Digital memory combo card comprising:
   (a) an interface card system configured to intervene between a host system and a first and a second Secure Digital card device, wherein the interface card system further comprises:
      (i) a CPU bus interface and a front Secure Digital bus interface on host side, both serving as interfaces for the host system,
      (ii) a host interface module connected to both the CPU bus interface and the front Secure Digital bus interface on host side, wherein the host interface module interprets a Secure Digital command and controls operation of the interface card system,
      (iii) a first and a second internal Secure Digital host engine each connected to the host interface module,
         wherein the first and second internal Secure Digital host engines are operative as a host controller for the first and second Secure Digital card devices, respectively,
         wherein each of the first and second internal Secure Digital host engines includes a direct transfer interface via which the first and second internal Secure Digital host engines are connected to a UDMA handler, and wherein a transfer mode and a data transfer path of each of the first and second internal Secure Digital host engines are selected by a direct transfer interface control signal issued through the UDMA handler, (iv) a first and a second selector connected to the first and second internal Secure Digital host engines, respectively, wherein each selector selects a path for data or a command, (v) a first and a second Secure Digital bus interface on device side connected to the first and second selectors, respectively, and (vi) a data pass-through control section connected to the front Secure Digital bus interface on host side and the first and second selectors, wherein the data pass-through control section allows Secure Digital commands and data to pass through as needed;

(b) the first Secure Digital card device connected to the interface card system via the first Secure Digital bus interface on device side, and (c) a slot for a micro Secure Digital card as the second Secure Digital card device connected to the Secure Digital memory combo card via the second Secure Digital bus interface on device side;

wherein the Secure Digital memory combo card is housed in a Secure Digital card device housing to be inserted into a standard Secure Digital memory slot.

6. The Secure Digital memory combo card according to claim 5, wherein the first Secure Digital card device is a wireless communication module.

7. The Secure Digital memory combo card according to claim 5, wherein the wireless communication module is selected from the group consisting of wireless LAN module complying with IEEE802.11, a module which realizes short-distance, high-speed wireless transfer, and a high-speed visible light communication module.

8. The Secure Digital memory combo card according to claim 6, wherein the wireless communication module is a wireless LAN module complying with IEEE802.11.

9. The Secure Digital memory combo card according to claim 6, wherein the wireless communication module is a module which realizes short distance, high speed wireless transfer.

10. The Secure Digital memory combo card according to claim 6, wherein the wireless communication module is a high speed visible light communication module.

* * * * *